Patented Nov. 24, 1953

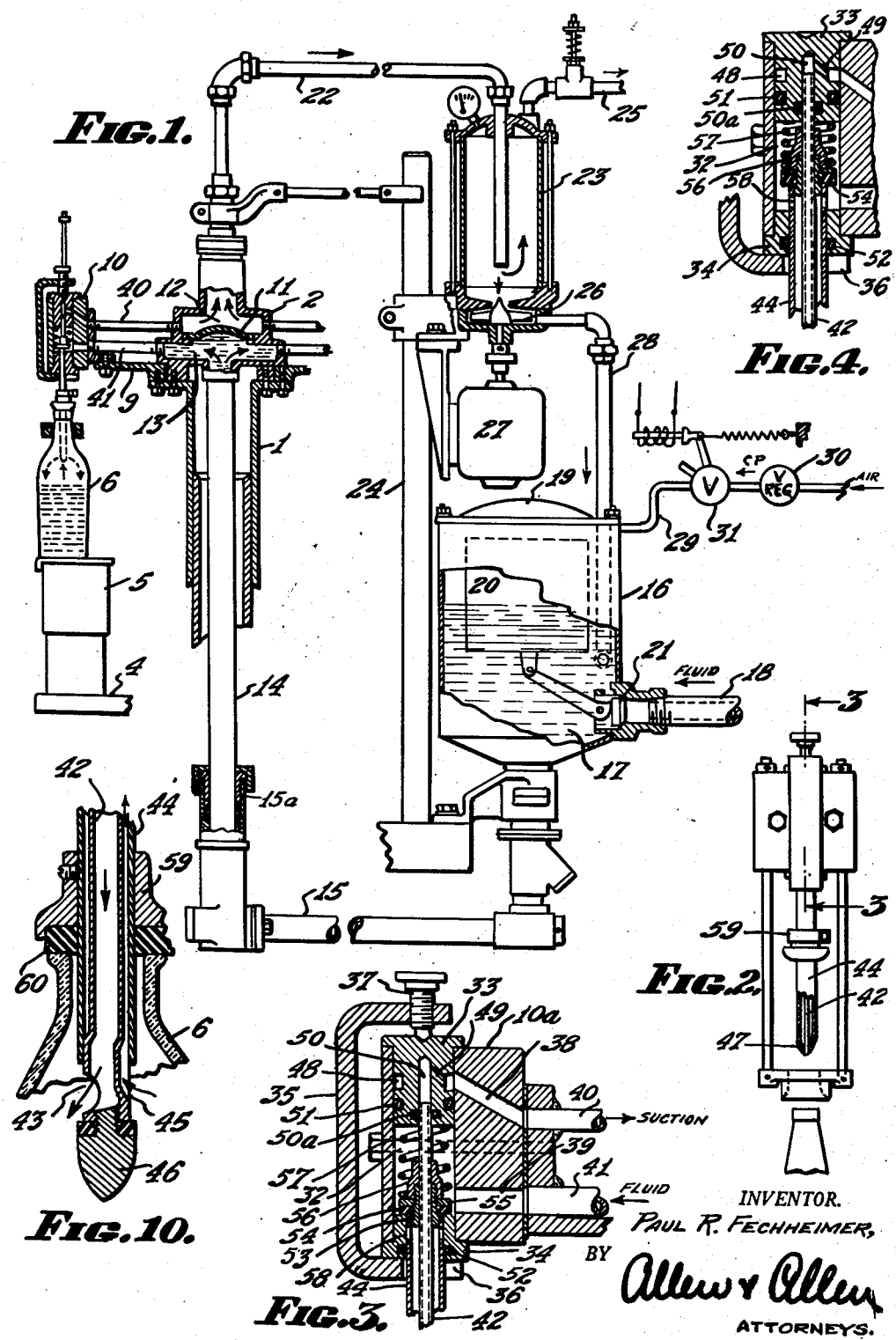

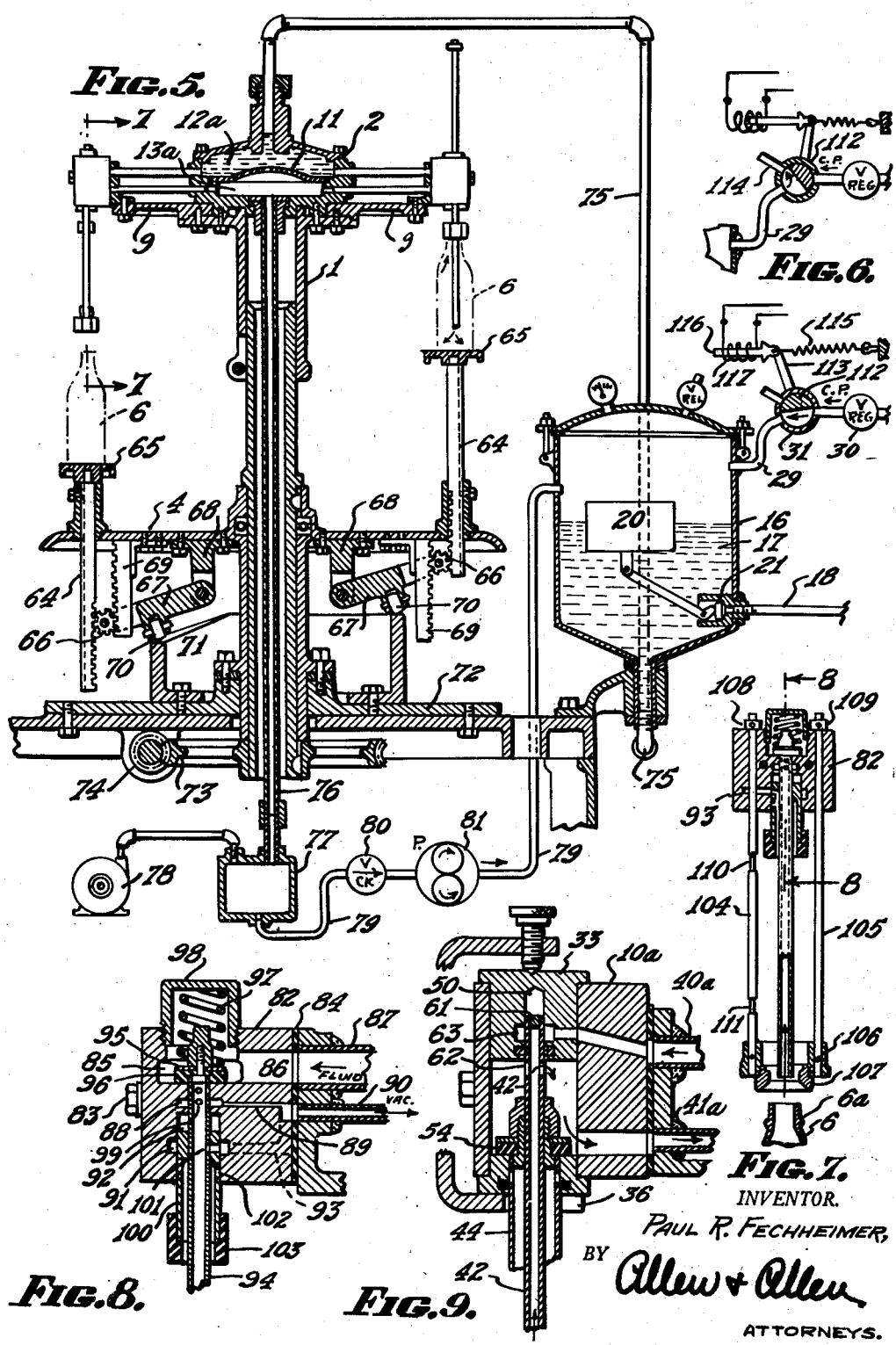

2,660,357

UNITED STATES PATENT OFFICE 2,660,357

PRESSURE-AND-VACUUM FILLING MACHINE

Paul R. Fechheimer, Cincinnati, Ohio, assignor to The Karl Kiefer Machine Company, Cincinnati, Ohio, a corporation of Ohio Application May 27, 1950, Serial No. 164,715

22 Claims. (Cl. 226—98)

My invention relates to machines for filling containers such, for example, as bottles or cans, and it has as one of its principal objects the provision of improvements in such machines to the end that filling under a combination of vacuum and pressure becomes commercially feasible.

As is well known, it is conventional to fill containers by introducing into them the filling substance through a spout or nozzle, the filling substance flowing into the container under pressure, and the displaced air escaping from the container through the mouth of it. In the filling of bottles with liquids it is equally conventional to provide a seal about the mouth of the container to draw a vacuum on it and to cause the filling material to be introduced into the container under the influence of the vacuum through a filling nozzle or spout which projects into the container. Suggestions that the filling of the bottles might be speeded up by both drawing a vacuum on them and introducing the filling material under a pressure greater than atmospheric have been made; but hitherto machines in which operations have been attempted along this line have not been fully successful. In particular it is an object of the invention to provide a machine in which both superatmospheric pressure and vacuum are employed, but which will have those commercially necessary factors of safety which will hereinafter be more fully outlined.

In a copending application entitled Machine for Filling Containers, Serial No. 8,885, filed February 17, 1948, I have described a machine and filling nozzle constructions in which the filling substance is drawn into the bottle or other container through an elongated nozzle inserted therein nearly to the bottom. In the operation of the mechanism, the container is entirely filled, any excess filling material passing off in the vacuum line which is connected to the top of the container by a suitable seal. After the container has been entirely filled in this fashion, the filling action is stopped, and the container is lowered so as to come away from the seal. The level of the filling material in the container will be somewhat lowered by the partial withdrawal of the filling spout or nozzle, as will be understood. However, it is necessary in the filling of many containers that an exact quantity of the contents be introduced therein, and in the mechanism of my said copending application this is accomplished by lowering the container to a point where the end of the filling nozzle effectively demarks the desired height of filling material in the container, after which any excess of the filling material is drawn off from the container by reversing the connections to the filling tube or spout so that it becomes connected to the vacuum line. After the container has been brought entirely away from the filling mechanism, an inward passage of air is maintained as respects the filling spouts so as to prevent drippage. It is an object of this invention to provide means and a method whereby a pressure-vacuum type of operation may be had in mechanism of this general character.

These and other objects of the invention which will be set forth hereinafter or will be apparent to one skilled in the art upon reading these specifications, including those objects which have to do with the provision of specific improvements in operating parts of a filling machine, I accomplish by that structure and arrangement of parts and in that procedure of which I shall now describe certain exemplary embodiments. Reference is made to the accompanying drawings wherein:

Figure 1 is a partial elevation with parts in section of filling apparatus to which my invention is addressed.

Figure 2 is a front elevation of a filling head, with a part broken away to show interior construction.

Figure 3 is a partial vertical sectional view of the apparatus of Figure 2 taken along the section line 3—3 of that figure.

Figure 4 is a similar sectional view showing the parts in a different operative relationship as determined by the position of the container.

Figure 5 is a partial vertical sectional view of another type of filling apparatus employing the features of my invention.

Figure 6 is a partial sectional view showing a valve arrangement which is the same as that of Figure 5, but in a different operative position.

Figure 7 is a vertical sectional view of a filling head taken along the section line 7—7 of Figure 5.

Figure 8 is another vertical sectional view of the head, taken at right angles to Figure 7 and responding to the section line 8—8 of the last named figure.

Figure 9 is another vertical sectional view of filler head apparatus related to that shown in Figures 1, 3 and 4 but modified with respect thereto.

Figure 10 is a partial sectional view of a filling spout adapted for use with the structures of Figures 1, 3 and 4.

Referring first to Figure 1, I have there illustrated the main parts of an exemplary filling machine. This machine comprises a central rotating column 1 which bears at its upper end a main head 2, and is connected at its lower end to a table 4 having means thereon 5 for supporting containers 6 and raising and lowering them as may be required. The main head of the apparatus has means 9 for supporting a plurality of filling heads 10 in proper positions to coact with the containers 6 on the movable supports 5. The main head has a hollow interior, divided by a diaphragm 11 into two chambers 12 and 13, the first of which is a vacuum chamber and the last of which is a chamber for the filling material. The chamber 13 is connected by a vertical conduit 14 inside the column, with a conduit 15 leading to a supply tank 16. The connection between pipes 14 and 15 is through a gland 15a which will permit rotation of the conduit 14 with the column 1, as is well understood in this art.

The container 16 for the filling material 17 is arranged to be supplied therewith by a conduit 18 from a suitable source (not shown). Since a superatmospheric pressure of air is to be built up in the container 16, it is closed by a suitable cover 19; and it will be understood that the filling material will be supplied through the conduit 18 at a pressure sufficient to overcome the internal pressure in the container 16. This may be accomplished in various ways but the introduction of the filling material into the container 16 by means of a pump, not illustrated, will ordinarily be found most convenient. The container 16 may be provided with a float 20 operating a valve 21 to prevent overfilling and to maintain in the container 16 a substantially constant level of the filling material.

The vacuum chamber 12 of the main head 2 is connected by a conduit 22 (provided with a gland to permit rotation of the main head) with a vacuum chamber and trap 23 mounted on a suitable support 24 on the machine. The vacuum chamber and trap will be connected by a conduit 25 to a vacuum pump (not shown). Any increments of filling material coming over into the vacuum chamber and trap 23 through the conduit 22 will be separated from the air stream therein, and will be returned to the container 16 through a pump 26, located at the bottom of the chamber 23, driven by a motor 27 mounted with respect to the support 24 and connected with the container 16 by a conduit 28. It will be understood that the pump 26 will operate with sufficient force to overcome the reaction of superatmospheric pressure in the container 16.

Pressure is built up in the container 16 by connecting it, through a conduit 29 with a source of air or other gas under pressure (not illustrated), such as a pump or tank. The conduit 29 may be provided with a pressure control valve 30 which will regulate the pressure imposed on the container 16; and another valve marked 31 the purpose and operation of which will hereinafter be fully described.

The construction of the filling head 10 can best be appreciated from Figures 3 and 4. Various constructions are possible; but in the preferred form of this aspect of my invention the filling head has a body 10a permanently mounted on the supporting member 9 and provided with a vertical bore 32. The filling tubes hereinafter described are mounted on or operate in connection with a pair of plugs 33 and 34 adapted to be inserted in opposite ends of the bore and provided with flanges to fix their inward positions. These plugs are held in place by a C-clamp having a body 35 with a lower portion bifurcated as at 36 to pass the filling tubes, and an upper portion provided with an adjusting screw 37 bearing against the upper plug 33. This arrangement makes the changing of filling spouts for different sizes of containers a relatively simple matter. The body 10a is provided with a vacuum passageway 38 and a passageway 39 for the filling material; and these passageways are in turn connected to the chambers 12 and 13 of the main head by vacuum and filling material conduits indicated at 40 and 41.

The filling tube structure forming part of the filling head may take various forms. In one exemplary embodiment, as shown in Figure 10, the filling spout comprises an inner tube 42, which is the filling tube and which has a side opening 43. This tube is inside a larger tube 44 which has a side opening 45; but the arrangement is such that the tubes have no direct communication with each other. The end of the filling spout may be finished by a cap-like member 46.

Another arrangement is shown in Figure 2 where the outer tube 44 is drawn inwardly at its lower end so as to be joined with the inner tube 42 which opens through the end of the spout. The outer tube, in the tapered portion, has one or more side openings 47 as shown.

The upper plug 33 is provided with an annular recess 48 communicating with the vacuum passageway 38, and having connection as at 49 with a central bore 50. The inner tube 42 slides within this central bore and is provided with a gasket 50a. A gasket 51 seals the upper plug against the inside of the bore.

The outer tube 44 slides in a perforation in the lower plug 34, and is provided with a sealing gasket 52. There is a fitting 53 in the upper end of the outer tube 44, bearing a gasket 54 and a washer-shaped abutment 55 held in place by a cap member 56. A compression spring 57 may be placed between the upper plug 33 and the washer-shaped abutment 55. The outer tube 44 is provided with one or more perforations 58 near its upper end; and the arrangement is such that when the tubes 44 and 42 are in the position shown in Figure 3, these perforations are closed by the lower plug 34. When, however, the tubes are raised as a unit, as shown in Figure 4, the perforations ride above the lower plug so that filling fluid from the passageway 39 can enter the outer tube 44. The inner tube, by reason of its communcaition with the vacum bore 50, serves to exhaust air from the containers as well as to carry away any excess of the filling material therefrom.

It will be understood that the filling spout is inoperative so long as the tubes are in the position shown in Figure 3. The filling nozzle is designed to be raised by the container itself so that, if a container fails to be in filling position on the filling machine platform 5, there will be no flow of the filling material. To this end, as shown in Figures 2 and 10, I affix adjustably to the filling nozzle a stop member 59 having a sealing element 60 on its lower surface, serving both to effect the seal with the upper edges of the mouth of the container 6, and to cause the container itself to elevate the filling nozzle from the position shown in Figure 3 to the position shown in Figure 4.

A modified form of structure is shown in Figure 9, where like parts have been given like index numerals. Here, however, the filling material is designed to be introduced into the container through the inner tube 42, while the outer tube draws the vacuum thereon. The inner tube 42 slides as before in the upper plug 33; but its upper end is closed as by a plug 61. The inner tube, moreover, is provided with one or more openings 62. An annular recess 63 is formed about the bore 50 in the upper plug and is connected by suitable passageways in the plug and in the body 10a to a line or conduit 40a which in this instance is the conduit for filling fluid. The space inside the body 10a between the plugs is connected by a passageway to a conduit 41a which in this instance is the suction conduit. The outer pipe or tube 44, as before, is provided with the washer-shaped abutment, and with the gasket 54. When the tubes 42 and 44 are raised by contact of the abutment 59 with the top surfaces of a container, the tube 44 thus becomes connected to suction, while the tube 42 by reason of the coincidence of the perforations 62 and the annular chamber 63 becomes connected to the supply of filling fluid. At the conclusion of the filling operation, the parts return to the position shown in Figure 9. Here the tube 44 is disconnected from suction, but by reason of passage of the perforations 62 in the inner pipe 42 below the lower end of the upper plug 33, the filling tube 42 is now connected to suction in such a way as to prevent drippage by drawing back into the structure any filling material clinging to the filling nozzle after its withdrawal from the container.

A somewhat modified filling machine is illustrated in Figure 5 where like parts have been given the same index numerals. The table 4, in this instance, carries vertically journaled toothed rods or racks 64 terminating upwardly in platforms 65 for the containers 6. A pinion 66 mounted on a lever 67 pivoted to a downwardly extending bracket 68 on the table 4 meshes with the teeth on the rack 64 and with the teeth on another rack 69 fixed beneath the table. This constitutes a motion multiplying mechanism, so that a given movement of the lever 67 produces a greater movement of the tray 65. The lever bears a cam follower 70 which engages the surface of a cam 71 fixed to the base 72 of the machine. As the table and column rotate with respect to this base, the platforms 65 and the containers on them are moved from extreme downward positions as shown at the left-hand side of Figure 5 to extreme upward positions as shown at the right-hand side of that figure. This mechanism is especially useful for the filling of tall containers, where for reasons hereinafter set forth it is desirable to move a filling spout into the container and downwardly to near the bottom of it.

It will be understood that the elements of the machine of Figure 5 are driven by a suitable source of power (not shown). In Figure 5 there is indicated a worm wheel 73 on the lower end of the column 1 meshing with a worm 74 which may be driven, directly or otherwise, by an electric motor.

In the structure of Figure 5 the main head 2 is divided as before into two chambers by the diaphragm 11; but in this instance the upper chamber 12a is a chamber for the filling material, while the lower chamber 13a is a vacuum or suction chamber. The upper chamber is connected by a conduit 75 with the container 16 for the filling material. The lower chamber is connected by a conduit 76 with a trap 77 having connection with a vacuum pump 78 and also, through a conduit 79 and a check valve 80, with a pump 81 and the container 16, as shown. Again, the pump 81 will have sufficient power to overcome the superatmospheric pressure in the container 16. This container, as before, is connected through valves 31 and 30 to a source of air or gas under pressure, such as a tank or pump.

Mechanism such as herein described may be employed with filling head constructions having certain features of those described in my copending application, Serial No. 8,885, filed February 17, 1948, and entitled Machine for Filling Containers. In the operation of such filling heads an elongated filling tube is passed into the container to the extent that its end occupies a position near the container bottom. Another tubular element effects a seal about the container mouth and is employed to draw a vacuum on the container. In an operation involving such apparatus, the container is completely filled with the filling material excepting for that space in it which is occupied by the first mentioned filling tube. There will be a slight lowering of the level of the filling material in the container as the tube is withdrawn therefrom; but it is ordinarily desired to fill the container to a fixed and predetermined lower level. To this end after the first mentioned complete filling, the container is lowered to such a position that the lower end of the filling tube marks the desired top level of the filling material, and the connections are reversed to the filling tube so that by suction it now acts to lower the level of the filling material. An arrangement is made whereby the position of the container with respect to the filling head operates valves in the several connections to effect the operations just described as well as a scavenging operation after the final lowering of the container. It will be understood that in the mechanism illustrated in Figure 5, the several positions of the containers will be determined by the positions of the platform elements 65 which in turn will be determined by the contour of the cam surface of the element 71 and the rotation of the table 4.

While the filling, level-lowering and scavenging operations referred to can be effected by various mechanisms, an exemplary filling head is illustrated in Figures 7 and 8. Here the head has a body 82 which is affixed to the main head of the machine as by a bolt 83 and is provided with a gasket 84 so that heads may be changed as required for different sizes of container. Within the head there is a chamber 85 connected by a passageway 83 as shown in Figure 8 to a conduit 87 for filling material and constituting a part of the main head. The body 82 also is provided with two annular vacuum chambers. One of these is illustrated at 88 and is connected by a small passageway 89 to the vacuum line 90 of the main head. The other vacuum chamber is shown at 91, and is an annular recess surrounding a bore 92. It is connected by a sidewise disposed passageway 93 with the vacuum conduit 90.

The filling tube 94 has a closed upper end provided with a washer-like abutment 95 and a gasket 96 which bears against the bottom of the chamber 85. A compression spring 97 engages between the abutment 95 and a threaded cap-like member 98 which closes the top of the chamber 85. The filling tube is provided with one or a plurality of orifices 99 so positioned that when the filling tube is raised, one at least of these orifices will be placed in communication with the chamber 85 so that filling material from the conduit 87 can enter the filling tube 94. When the filling tube is in its lowered position as shown in Figure 8, the gasket 96 seals off the chamber 85 from the tube 94 and hence stops the flow of filling material. In this position, however, it will be noted from Figure 8 that at least one of the orifices 99 of the filling tube is now in communication with the small annular vacuum chamber 88. In this position suction is applied to the filling tube 94.

A tubular element 100 surrounds the filling tube 94 and at the top makes a tight connection with it. This tube slides in the bore 92 along with the tube 94 to which it is affixed. There is an opening 101 formed through both tubes in such position that when they are in their lowermost position as illustrated in Figure 8, the inner tube 94 will be in communication with the vacuum chamber 91. There is another opening 102 through the wall only of the outer tube 100 in such position that when the tube combination is raised, the outer tube will be in communication with the vacuum chamber 91. The outer tube is provided with a sealing element 103 adapted to contact the mouth of the container 6 and effect a vacuum-tight connection therewith.

As will be seen in Figure 7, a pair of rods 104 and 105 are vertically slidable in the body 82. At their lower ends these rods bear an annulus 106 carrying a fitting 107 which will contact some portion of the container other than the top or mouth surfaces thereof. In the particular embodiment, the fitting contacts a ridge 6a on the bottle 6 formed below the mouth of it; but in other embodiments the fitting might, by way of example, contact the shoulders of a bottle. It will be evident that as the container 6 is moved upwardly as by the platform 65, the annulus and fitting will move upwardly with it, the rods 104 and 105 sliding vertically in the body 82. Collars 108 and 109 may be employed to determine the lowermost position of the fitting.

It will be noted also that one of the rods 104 extends through the vacuum passageway 93, and the dimensions are such that the rod closes off this passageway. To cause the rod to exert a valving action, I provide it with reduced portions indicated at 110 and 111. It will be evident that if the fitting is moved upwardly to such position that either of these reduced portions coincides with the lateral passageway 93, this passage will be opened up, thus connecting the vacuum chamber 91 with the vacuum line 90.

In operation, a container 6 on a platform 65, occupying initially the position shown in Figure 7, is first moved upwardly (carrying the annulus 106 and fitting 107 with it) until the mouth of the container contacts the sealing element 103 and moves the combination of tubes 100 and 94 upwardly against the compressive force of the spring 97. The uppermost position of the container will be determined by the cam element 71 as aforesaid. In this position the inner or filling tube 94 will be connected through one or more of the orifices 99 to the chamber 85; and filling material will flow into the container through the filling tube 94, the bottom of which is near the bottom of the container. Foaming is thus minimized. The passageway 101 will be cut off by the rising of the tube combination; but the passageway 102 will now place the outer tube 100 in communication with the vacuum chamber 91. At the same time the reduced portion 111 of the rod 104 will coincide with the passageway 93, opening up the passageway, connecting the vacuum chamber 91 with the vacuum line 90 and drawing a vacuum on the container to assist in the flow of material into it and to draw off excess filling material and foam when the container is completely filled.

After the complete filling of the container, it is lowered by the platform 65 to a position in which the lower end of the tube 94 marks the desired maximum liquid level. This lowering brings the mouth of the container away from the sealing element 103 and the tube combination is driven downwardly by the spring 97. The flow of liquid from the conduit 87 is thus cut off from the filling tube 94. The passageway 101 now coincides with the vacuum chamber 91 as illustrated in Figure 8. At the same time the reduced portion 110 of the rod 104 is brought into coincidence with the passageway 93, and the passageway is opened up, thus connecting the filling tube 94 with the vacuum line. Excess fluid in the container above the desired maximum liquid level is rapidly drawn off through the filling tube and an exact fill is attained.

Thereafter the container 6 is further lowered, bringing it entirely away from the fitting 107, which has now attained its lowermost position. In this position the rod 104 cuts off the passageway 93. Through one or more of the orifices 99, the filling tube remains connected with the vacuum chamber 88 so that the suction is maintained to scavenge the tube 94 and prevent drippage. The vacuum passageway 89 is of such small cross-section that there is very little interference with the maintenance of adequate suction in the system, while a sufficient scavenging action may be maintained.

It has been indicated that the container or reservoir 16 for the filling fluid is connected through valves 31 and 30 with a source of air or gas under pressure. In a system of the type herein described I have found that it is advisable to be able to relieve the pressure on the filling material substantially instantaneously and automatically upon the occurrence of a stoppage in the mechanism. To this end a suitable valving arrangement is provided as at 30 which will serve to connect the container or reservoir 16 either to the source of gas under pressure or to the external atmosphere. Various valve arrangements may be employed. I have illustrated a simple one in which the valve 31 is a rotary valve having a core 112 with an operating arm 113. The core is so arranged and configured that in the position shown in Figure 5 the conduit 29 is connected to the pressure line. In the position shown in Figure 6 the conduit 29 is disconnected from the pressure line and is connected to an open tube 114 so that super-atmospheric pressure in the reservoir 16 is rapidly relieved. I may attach a tension spring 115 to the operating arm 113 and to an external support in such a way as to urge the valve core to the position shown in Figure 6, and I may connect to the valve arm the armature 116 of a solenoid having a coil 117 which is electrically connected to the circuit of the prime mover of the filling machine in such a way as to actuate the solenoid only when the prime mover is in operation. Stoppage of the machine for any reason, therefore, will result in immediate relief of the pressure in the reservoir 16. It will be understood that the machine may be provided with safety mechanisms, known in the art which will produce stoppage upon the occurrence of various contingencies such as failure of the feeding means for containers, absence of a container on any of the platforms 65 when these rotate to filling position, breakage of a container in the machine, and the like.

Another advantage of the construction just described is that it permits the use of a smaller vacuum chamber and trap than would otherwise be possible. When the machine is stopped, any containers which are being filled will continue to be filled at the level of the exhaust tube, after which the excess filling material will be drawn off into the vacuum chamber and trap unless or until the vacuum is shut off. This will not ordinarily be done during a temporary machine stoppage so that it is advisable to minimize the flow of excess material as much as possible when the rotary parts of the machine are not in motion. The relief of pressure on the material in the tank 16 minimizes the flow and hence permits operations with a smaller vacuum chamber and trap.

Modifications may be made in my invention without departing from the spirit thereof. Having thus described my invention in certain exemplary embodiments, what I claim as new and desire to secure by Letters Patent is:

1. In container filling apparatus a head element formed to provide two chambers one for filling material under pressure and the other for suction, at least one filling spout structure associated with said head and provided with a seal to make a closed system with the container to be filled, said filling spout having connections respectively with said chambers, a reservoir for filling material in communication with the said first mentioned chamber, a trap in communication with the second mentioned chamber, a vacuum pump in communication with said trap, means for exerting superatmospheric pressure in communication with said reservoir, a liquid transmitting connection between said trap and said reservoir including a pump having sufficient force to overcome the suction on said trap and the superatmospheric pressure on said reservoir so as to move filling material from the trap to the reservoir, and a two-way valve in the means for applying pressure to said reservoir, said valve acting in one position to connect the said reservoir with a source of gas under pressure and in another position to connect said reservoir with the external atmosphere whereby rapidly to relieve the superatmospheric pressure therein.

2. The structure claimed in claim 1 wherein a plurality of filling spouts are associated with said head and including moving means to juxtapose containers to said spouts and remove them therefrom and driving means for said head and said moving means.

3. The structure claimed in claim 1 including a connection between said valve and said driving means effective to cause said valve to assume said second mentioned position upon cessation of operation of said driving means.

4. The structure claimed in claim 2 wherein said filling spouts comprise a pair of tubes one within the other and adapted to enter said containers during filling, and means movable by a container when brought into juxtaposition to the said filling spouts to connect said tubes respectively with the chambers of the head whereby to constitute one of said tubes a filling tube and the other a suction tube, said tubes being disconnected from said chambers upon removal of said container.

5. The structure claimed in claim 2 wherein said filling spouts comprise a pair of tubes one within the other and adapted to enter said containers during filling, and means movable by a container when brought into juxtaposition to the said filling spouts to connect said tubes respectively with the chambers of the head whereby to constitute one of said tubes a filling tube and the other a suction tube, said tubes being disconnected from said chambers upon removal of said container, and means effective subsequent to said disconnection to effect a scavenging connection between said filling tube and said first mentioned chamber.

6. The structure claimed in claim 2 wherein said filling spouts comprise a pair of tubes one within the other and adapted to enter said containers during filling, and means movable by a container when brought into juxtaposition to the said filling spouts to connect said tubes respectively with the chambers of the head whereby to constitute one of said tubes a filling tube and the other a suction tube, said tubes being disconnected from said chambers upon removal of said container, and means effective subsequent to said disconnection to effect a scavenging connection between said filling tube and said first mentioned chamber, and a connection between said valve and said driving means effective to cause said valve to assume said second mentioned position upon cessation of operation of said driving means.

7. The structure claimed in claim 2 wherein said filling spouts each have an elongated filling tube adapted to extend into a container, a relatively shorter tube surrounding said filling tube and means movable by the container for effecting a connection between said last mentioned tube and the first mentioned chamber and between said first mentioned tube and the second mentioned chamber during filling and for breaking said connections when said container is removed.

8. The structure claimed in claim 2 wherein said filling spouts each have an elongated filling tube adapted to extend into a container, a relatively shorter tube surrounding said filling tube and means movable by the container for effecting a connection between said last mentioned tube and the first mentioned chamber and between said first mentioned tube and the second mentioned chamber during filling and for breaking said connections when said container is removed, and for then effecting a scavenging connection between said filling tube and said first mentioned chamber.

9. The structure claimed in claim 8 wherein each filling spout structure comprises a body in which said tubes are slidable as a unit, said body having a chamber for filling material entered by said filling tube, said filling tube having a closed end, the said end bearing a valve element operating against a face of said chamber, said tube having a perforation adjacent said element so that when said tube is thrust into said chamber so as to displace said element from said face, said tube will be placed in communication with said chamber, said body having a vacuum chamber adapted to be placed in communication with said filling tube through a perforation in said tube when said element is against said face, said body also having a vacuum passageway which lies in communication with said outer tube when said filling tube is in communication with said filling chamber.

10. The structure claimed in claim 8 wherein each filling spout structure comprises a body in which said tubes are slidable as a unit, said body having a chamber for filling material entered by said filling tube, said filling tube having a closed end, the said end bearing a valve element operating against a face of said chamber, said tube having a perforation adjacent said element so that when said tube is thrust into said chamber so as to displace said element from said face, said tube will be placed in communication with said chamber, said body having a vacuum chamber adapted to be placed in communication with said filling tube through a perforation in said tube when said element is against said face, said body also having a vacuum passageway which lies in communication with said outer tube when said filling tube is in communication with said filling chamber, and with said filling tube through a perforation in both tubes when said element lies against said face, and valving means for said last mentioned passageway operated by the container, said valving means acting in two positions to open said passageway so that a container may be entirely filled with filling material then lowered to a position at which the end of said filling tube coincides with the desired liquid level in said container, and the excess filling material withdrawn from said container through said filling tube.

11. The structure claimed in claim 10 wherein said means moved by the container comprises a container engaging fixture supported by rods slidable in said body, in which one of said rods extends transversely across said passageway so as to close it and in which said rod has reduced portions acting in certain positions of said container to open said passageway.

12. The structure claimed in claim 10 wherein said means moved by the container comprises a container engaging fixture supported by rods slidable in said body, in which one of said rods extends transversely across said passageway so as to close it and in which said rod has reduced portions acting in certain positions of said container to open said passageway, and a connection between said valve and said driving means effective to cause said valve to assume said second mentioned position upon cessation of operation of said driving means.

13. In a filling spout construction for container filling machines having a head with separate chambers for filling material and for suction, a body having a vertical bore, flanged plugs for insertion in said bore at the top and bottom portions of said body, filling and exhaust tubes, one within the other, vertically slidable as a unit, the outer one of said tubes having a bearing in the lower one of said plugs and the inner one of said tubes having a bearing in the upper one of said plugs, said upper plug having a chamber for filling material, a connection between said chamber and the first mentioned chamber of the head effective through said plug in said body, the upper end of the inner tube being closed but provided with a perforation adapted to coincide with said chamber in the uppermost position of said tube and to effect a connection between said tube and said chamber, and adapted in the lowermost position of said tube to lie below the lower end of the upper one of said plugs to effect a connection between said inner tube and the space below said plug, said plugs being spaced from each other so as to provide a suction chamber between them having connection effective through said body with the suction chamber of said head, the upper end of said outer tube being closed and provided with a gasket for effecting sealing connection against the upper face of the lower plug, said outer tube having a perforation adjacent its closed end adapted in the uppermost position of said tube to bring it into communication with said suction chamber, and a C-clamp element for engaging said plugs and holding them in said bore.

14. In a filling spout structure for use with a filling machine having a head with chambers for filling material and suction, a body having a vertical bore, flanged plugs in the upper and lower ends of said bore, a structure comprising tubes, one within the other and movable as a unit, the outer tube being journaled in the lower of said plugs and the inner tube being journaled in the upper of said plugs, a connection effective through the upper plug and body between the inner tube and the suction chamber of said head, said plugs being spaced in said body to provide a chamber for filling material therebetween, a connection effective through said body between said chamber and the filling material chamber of said head, said outer tube having a closed upper end with a gasket element sealing against the upper surface of the lower plug, and provided with a perforation adjacent its closed end such that in the upper position of said outer tube, it will be placed in communication with the filling material chamber in said body, and C-clamp means for holding said plugs in said bore.

15. In a filling spout structure, a body having a vertical bore, flanged plugs in the upper and lower ends of said bore, a structure comprising tubes, one within the other and movable as a unit, the outer tube being slidably mounted in the lower one of said plugs, and the inner tube extending into a perforation in the upper one of said plugs, a connection in said body effective through the upper plug to the inner of said tubes, and a connection in said body effective between the plugs to the outer of said tubes, together with releasable clamp means for holding said plugs in said bore.

16. In container filling apparatus a head element formed to provide two chambers one for filling material and the other for suction, a plurality of filling spouts associated with said head, each of said filling spouts having connections respectively with said chambers and a seal for contact with the mouth of a container to be filled to make a closed system therewith, a sealed reservoir for filling material under super-atmospheric pressure in communication with said first mentioned chamber, means for exerting super-atmospheric pressure in communication with said reservoir, a trap in communication with said second mentioned chamber, a vacuum pump in communication with said trap, and a liquid transmitting connection between said trap and said reservoir including a pump having sufficient force to overcome the suction on said trap and super-atmospheric pressure on said liquid reservoir so as to move filling material from the trap to the reservoir.

17. In container filling apparatus, a head element formed to provide two chambers one for filling material and the other for suction, a plurality of filling spouts associated with said head, each of said filling spouts having connections respectively with said chambers and a seal for contact with the mouth of a container to be filled to make a closed system therewith, said filling spouts each including a body, a pair of tubes one within the other extending downwardly from said body and adapted to enter the container during filling, and valve means in said body movable by a container when brought into juxtaposition to said filling spout to connect said tubes respectively with the chambers of the head so as to constitute one of said tubes a filling tube and the other a suction tube, said tubes being disconnected from said chambers by said valve means upon removal of said container.

18. The structure claimed in claim 17 wherein said valve means includes means effective subsequent to said disconnection of said tubes to effect a scavenging connection between one of said tubes and said suction chamber.

19. In a filling spout structure a body having a vertical bore, flanged plugs in the upper and lower ends of said bore, a structure comprising a pair of tubes one within the other and movable as a unit journaled in the lower one of said plugs, a connection in said body effective to the inner of said tubes, and a connection in said body effective to the outer of said tubes, together with releasable clamping means for holding said plugs in said bore.

20. In a filling spout structure, a body having a vertical bore, flanged plugs in the upper and lower ends of said bore, a structure comprising a pair of tubes one within the other and movable as a unit journaled in the lower one of said plugs, passageways in said body, and openings in said tubes being movable from a position wherein said openings are out of communication with said passageways to a position wherein said openings are in communication with said passageways, and C-clamp means for holding said plugs in said bore.

21. In a filling spout structure, a body having a vertical bore, flanged plugs in the upper and lower ends of said bore, a structure comprising a pair of tubes one within the other and movable as a unit journaled in the lower one of said plugs, spaced apart passageways in said body, and openings in said tubes for communication with said passageways, and valve means carried by said tubed structure for closing the connection between one of said passageways and the opening in the outer tube.

22. In a filling spout structure, a body having a vertical bore, flanged plugs in the upper and lower ends of said bore, a structure comprising a pair of tubes one within the other and movable as a unit journaled in the lower one of said plugs, a first connection in said body effective to the inner of said tubes, a second connection in said body effective to the outer of said tubes, and valve means carried by said tube structure for closing the connection to the outer of said tubes, together with releasable clamping means for holding said plugs in said bore.

PAUL R. FECHHEIMER.

References Cited in the file of this patent

UNITED STATES PATENTS

| Number | Name | Date |
|---|---|---|
| 1,763,240 | Krefer | June 10, 1930 |
| 2,071,006 | Urschel | Feb. 16, 1937 |